TELEPHONOGRAPH ADAPTED TO BE CONNECTED TO THE PUBLIC TELEPHONE SYSTEM

Filed Jan. 12, 1951 2 Sheets-Sheet 1

Inventors
Willy Müller and
Hans Labhart
By
Singer Stern & Carlberg
attys

Fig. 4

| fn | POSITION | | | | | | | |
|---|---|---|---|---|---|---|---|---|
| | 0 | 1 | 2 | 3 | 4 | 5 | 6 | 0 |
| 1 | + | − | − | − | − | − | − | + |
| 2 | − | + | − | − | − | − | − | − |
| 3 | − | − | + | − | − | − | − | − |
| 4 | − | − | + | + | − | − | − | − |
| 5 | − | − | − | − | + | − | − | − |
| 6 | − | − | − | − | + | + | − | − |

Fig. 5

| ank | RESPONSE-TEXT | | | | | | | | | | | | | | | |
|---|---|---|---|---|---|---|---|---|---|---|---|---|---|---|---|---|
| | RECORDED | | SPEAK | L | | P | | M | | B | | R | | W | | ..... |
| 1 | | + | | | | | | | | | | | | | | |
| 2 | + | + | + + | + | + | + | + | + | + | + | + | + | + | + | + | |
| 3 | | | + | | | | | | | | | | | | | + |
| 4 | | | | + | + | + | + | + | + | + | + | + | + | + | + | + |
| 5 | | | | | | | | | | | | | | | | |
| 6 | | | + + | | + | | + | | + | | + | | + | | + | |
| 7 | | | | | + | | | | | | | | | | | |
| 8 | | | | | | | + | | | | | | | | | |
| 9 | | | | | | | | | + | | | | | | | |
| 10 | | | | | | | | | | | + | | | | | |
| 11 | | | | | | | | | | | | | + | | | |
| 12 | | | | | | | | | | | | | | | + | |

Inventors
Willy Müller and
Hans Labhart
By
Singer Stern & Carlberg
attys

Patented Oct. 26, 1954

2,692,915

UNITED STATES PATENT OFFICE 2,692,915

TELEPHONOGRAPH ADAPTED TO BE CONNECTED TO THE PUBLIC TELEPHONE SYSTEM

Willy Müller and Hans Labhart, Zurich, Switzerland

Application January 12, 1951, Serial No. 205,645

6 Claims. (Cl. 179—6)

Figures 1, 2, 3:
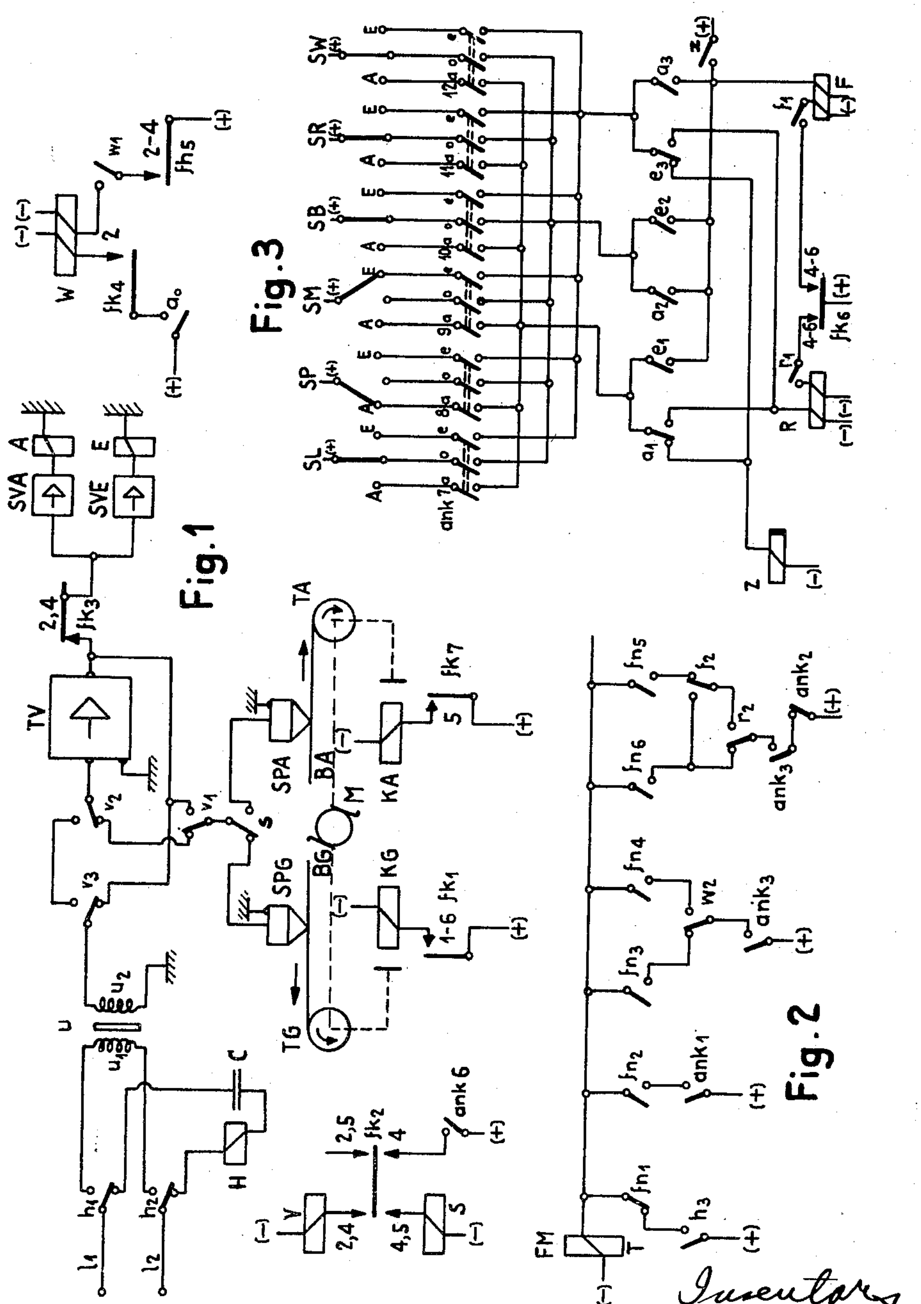

Telephonographs adapted to be connected to a public telephone system which have the main object of automatically recording a message received in the absence of the subscriber and to notify the same to the subscriber if desired, have been suggested in many forms.

Moreover devices have been suggested which make it possible that the subscriber of the telephonograph can call his telephonograph from any other subscriber's station or call box and can enforce the reproduction of the recorded messages by appropriate control orders.

For this purpose telephonographs have been developed in such a manner that, at least after a preliminary approach by a responder device, in certain operative phases code words, for example a series of numbers, are communicated to the subscriber which by their mutual spacing in time define intervals during which the subscriber has an opportunity of giving control orders to the telephonograph which release the reproduction of the messages recorded if these control orders conform with a code key adjusted.

It has been formerly suggested to use sounds of quite a definite frequency as the control orders, which frequency is produced by special instruments, and it has later been suggested to construct a telephonograph in such a manner that sound impulses of any desired frequencies could be used as control impulses, which has the advantage that the telephonograph can be approached without the aid of any auxiliary means from any subscriber's station or call box. On the other hand this had the disadvantage that any disturbing noises such as the banging of a door, the sound of a bell or word impulses uttered by chances could become effective so that often wrong approaches were caused.

On the other hand so called "approaches by vowels" have been suggested for telephonographs in which use is made of the fact that certain characteristic formants, i. e. the higher harmonics of a spoken vowel sound lie always in the same frequency range independent of the frequency of the basic sound, and are accordingly capable of being sifted-out and decodified by frequency-sensitive relay arrangements. It has been suggested to adjust a coding device to a certain sequence of vowels for example to "AR–EE–AY" (pronounce like the vowels in "are," "see," "bay") and to design the telephonograph in such a manner that in the case of conformity of the sequence of vowels spoken with that of the vowels adjusted the reproduction is triggered-off. However the difficulty arose that the number of combinations capable of being adjusted in the coding device is not very large, and that some vowel sounds such as "RA–O–OO" or "EE–AY" can not so easily be separated automatically from one another. Moreover often wrong approaches occurred when the corresponding control vowels were not spoken in a clear rthythmical sequence one after the other.

A device having the object of allowing a codified remote control approach of a telephonograph for reproduction purposes via a public telephone system, in which the telephonograph has a coding device in addition to a responder device, in which coding device the manner and sequence of approach orders to be transmitted to the telephonograph can be adjusted, is now characterised according to the invention by means which have the effect that code words are transmitted by the responder device to the subscriber making the approach in response to a preliminary approach, which code words are separated from one another and which have the effect that, during the intervals between them, relay arrangement selectively sensitive to frequencies are made ready for receiving the approach orders, which relay arrangements are individually selectively adjusted to a frequency range which characterises a predetermined vowel sound and which relay arrangements cooperate through their switch members with the other parts of the telephonograph in such a manner that the remote control approach with the aim at reproduction has a success only when the subscriber making that approach transmits to the telephonograph, during the predetermined intervals only, those vowel signs which contain the predetermined vowel sound as the essential constituent.

By vowel signs which contain a predetermined vowel sound as the essential constituent, either the vowel sounds "AK," "AY" etc. can be understood, or words like "are," "bar," "Arthur" for the vowel "AR," or "bay," 'nay," "say" for the sound "AY." As code words which are transmitted by the responder device to the subscriber making the approach in order to mark predetermined intervals, e. g. a series of number like "one"—"two"—"three" etc. or a number of letter code words can be used such as "Arthur," "Bailey," "Dora" etc.

With this general statement of the objects and purposes of our invention we will now proceed to describe the embodiment thereof and the manner in which our invention is carried out, and it will be understood that while we have described what may be considered as a preferable embodiment of our invention, we do not limit ourselves to the precise conditions and proportions herein set forth, as they may be varied by those skilled in the art in accordance with the particular purposes for which they are intended, and the conditions under which they are to be utilized.

In the accompanying drawings those parts of a telephonograph, which are necessary for the understanding of the invention and which belong to the device according to the invention, are diagrammatically represented, and subsequently the components represented and their cooperation will be described.

Fig. 1 shows diagrammatically the main parts,

Fig. 2 the contact members for the operation of a follow-up switch magnet, and

Fig. 3 the coding device;

Figs. 4 and 5 show tabulated representation of the positions of the contact members.

It should be assumed that the telephonograph represented is associated with a telephone subscriber's station, and that the device as a whole is connected by the main lines L1 and L2 to a public telephone system, i. e. that over the said main lines the usual talking and calling currents can be passed. The aforesaid telephone subscriber's station is not represented in detail. The telephonograph proper contains—beside other members which are not represented—the following devices essential for the understanding of the invention:

A responder sound-head SPG cooperates with a sound carrier, for example a magnetized carrier band BG, which is moved by means of a drum TG in the direction of the arrow provided this drum is driven from a prime mover M which is effected by means of a magnetic clutch KG when the same is energised. On the carrier band BG a spoken text is recorded which is picked up by the sound head SPG and is converted into a current of talking frequencies.

A receiver sound head SPA cooperates with another sound carrier, for example the carrier band BA which is driven by the drum TA in the direction of the arrow provided the latter is driven from the prime mover M, which is effected by excitation of the magnetic clutch KA. The sound head SPA as such has the dual task, on the one hand of magnetically recording incoming messages on the carrier band BA, and on the other hand of converting the recorded messages again into currents of talking frequencies and to release them for reproduction. For this purpose, the carrier band BA is in fact associated with backwinding and effacer-means and with appropriate control members for these means, which are well known per se and accordingly are not represented in the accompanying drawings. However, such means are described and shown in U. S. Patent No. 2,519,568, filed February 27, 1948 (assigned to Daphné Investment Trust).

As a further very important member, a sound amplifier TV is provided, which amplifies currents of talking frequency which are supplied to it from the left hand side in the drawing, and passes them on towards the right hand side.

Particularly important for the understanding of the present invention are two selective amplifiers SVA and SVE which have the object of reinforcing some quite special frequency ranges out of the frequency gamut of talking currents, and thereby to energise a relay A or E, respectively associated with them. The amplifier SVA is for example adjusted to a frequency band of 700 to 1200 C. P. S., and the amplifier SVE to a frequency band of 1900 to 3000 C. P. S. A talking current, which corresponds to the vowel "AR," now contains in its gamut in any case, i. e. independent of the frequency of the basic sound, the characteristic overtone harmonics in the frequency range of 700 to 1200 C. P. S., while a talking current that corresponds to the spoken vowel "AY," has as the characteristic formant overtone harmonics in the frequency range of 1900 to 3000 C. P. S. In this manner it will be achieved that the relay A responds when the amplifier is supplied with a talking current which corresponds to the vowel "AR," whereas the relay E will be energised under the influence of a current of talking frequency supplied to the amplifier SVE which corresponds to the spoken vowel "AY." By means of delayed-action means known in themselves it can be achieved that the relays A and E are energised only when the relevant frequencies are effective during a predetermined minimum period, for example during at least 100 msec. In practice an approach period of 100 to 300 msec. is completely sufficient so that unintentional disturbance noises, which by chance may contain the frequency range concerned, can not energise the relay. For example the response period of the said relays may be somewhat extended, or the time constant C. R., which is the product of the capacities C and resistances R effective in the rectifier circuits of the selective amplifiers, can be made larger than $10^{-1}$ sec. so that for example with a resistance of $R=10^5$ ohms the capacity F is made at least equal to 1 microfarad.

As a further important control member a follow-up switch is provided for the telephonograph shown, which in a manner known in itself moves-on step-by-step from a basic position via intermediate positions, by means of a magnet FM, which is under the influence of associated control cams *fn* and of other switch members, and which in this process performs switching operations at various positions and in various combinations. The switching positions concerned are denoted *fk* and the figures indicated at the corresponding switching position 1, 2–6 designate the subsequent switch positions in which the corresponding connecting contact piece (which is indicated as an arrowhead) is connected to the switch arm *fk*. In the table according to Fig. 4 it is represented in which positions of the follow-up switch the cam contacts *fn* are closed, the figures indicated in the vertical columns indicating the switch position, and the cam designations indicated in the horizontal lines denoting the control cam concerned.

Lastly, another important control member, which will now firstly be described in its basic construction and in its operation, is constituted by a cam roller switch, the cam discs of which are rotated in synchronism with the carrier band BG and which is provided with cam contacts *ank* which are operated at predetermined moments, to wit in such a manner that a cam switch *ank* is coordinated to each section of the responder text recorded on the transmitter band in such a way that the operation of the said cam switches is tied-up with the text sections recorded on the carrier BG as indicated in the table according to Fig. 5. Such a cam roller switch is disclosed for example in U. S. Patent No. 2,519,568, filed February 27, 1948 (assigned to Daphné Investment Trust).

In order to describe now the manner of operation of the telephonograph and at the same time the object of the elements not described so far, may it be assumed that the subscriber's station associated with the telephonograph be called via the office lines L1 and L2, but that there is not reply to the call. As will be seen in Fig. 1, such a calling current is passed to the relay H, to wit via the circuit:

(1) Line L1—H-relay contact *h1*—condenser C—relay coil H—H-relay contact *h2*—line L2.

The H-relay is in actual practice constructed as a step-by-step switching mechanism in such a manner that it is energised but after the fourth calling impulse in order to give the subscriber of the station time to take the call directly, in which case the telephonograph remains out of commission. If however this does not happen, the H-relay switches over its contacts *h1*, *h2* (Fig. 1) and *h3* (Fig. 2) at the fourth calling impulse and keeps itself permanently in this position (1) whereby according to Fig. 1 the following talking circuit is established:

(2) Line L1—contact *h1*—coil *u1* of the talking current transmitter U—contact *h2*—line L2.

At the same time, the follow-up switch magnet FM receives a current impulse, as will be seen from Fig. 2, to wit via the following circuit:

(3) Positive battery pole (+)—H-relay contact *h3*—follow-up switch cam *fn1*—magnet FM—negative battery pole (−).

Thereby the follow-up switch is switched-on, from the 0-position as shown, into its first position, in which it opens the cam switch *fn1* according to the diagram of Fig. 4 given hereinabove schematically, so that the circuit (3) is interrupted and the follow-up switch comes to a standstill in the position (1).

In the preparatory position the prime mover M of the telephonograph is switched-on, and likewise the amplifier and other members such as the current supply sources for the relay circuits are put into readiness for operation. At the same time the recorder device clutch KG is energized in the follow-up switch positions 1–6 over the following circuit:

(4) Positive battery pole (+) — follow-up switch contact *fk1*—clutch electromagnet KG—negative battery pole (−).

Accordingly the carrier band BG is carried along by the driving drum TG in the direction of the arrow and the sound-head SPG transduces the response text magnetically recorded on the carrier BG into corresponding talking A. C. which are passed to the transformer U via the following circuit:

(5) Responder sound head SPG—S-relay contact *s*—V-relay contacts *v1* and *v2*—sound amplifier TV—V-relay contact *v3*—secondary coil *u2* of the transformer U—earth.

Accordingly the first part of the recorded response is passed via the circuit (2) on to the calling subscriber, for example "This is Miller, of Zurich, your message will be automatically recorded."

When this part of the response is completely delivered, the cam *ank1* of the drum switch is put into operation according to the operation scheme of Fig. 5. Since in the position (1) of the follow-up switch its cam switch *fn2* is switched on (see Fig. 4) a new follow-on impulse for the follow-up-switch magnet FM results via the circuit:

(6) Positive battery pole (+)—*ank1*—follow-up switch cam *fn2*—follow-up switch magnet FM—negative battery pole (−), so that the follow-up switch is moved to the position (2) and remains there because when reaching this position the cam contact *fn2* of the follow-up switch is opened so that the circuit (6) is again interrupted (Fig. 4).

As follows from Fig. 1, an exciter-circuit:

(7) Positive battery pole (+)—*fk2*—relay V—negative battery pole (−), is closed by the aid of the follow-up switch contact *fk2* in the position (2) of the follow-up switch whereby the relay V is energised, and its contacts *v1*—*v2*—*v3* are switched over.

Moreover in the position (2) of the follow-up switch, the contact *fk3* of the same connects the output side of the sound amplifier TV to the input sides of the two selective amplifiers SVA and SVE. Thereby, and by the excitation of the V-relay over circuit (7) as aforesaid, the circuit (5) is replaced by the following circuit:

(8) Earth—V-transformer coil *u2*—V-relay contacts *v3* and *v2*—sound amplifier TV—follow-up switch contact *fk3*—parallel shunting of the groups SVA–A and SVE–E—earth.

There are now two different possibilities: Either the calling subscriber is the owner of the telephonograph; in this case he wants the reproduction of any messages recorded in his absence. Or he is a different person; then he wants to have a message to the owner of the telephonograph recorded automatically.

Dealing first with owner of the telephonograph himself to be calling:

In the interval following after the word "recorded" the subscriber who is connected to the telephonograph has an opportunity to pronounce the vowel sound "AR" or a word containing it like "are," "bar," "Arthur" into his microphone, so that the corresponding approach current is passed via the circuits (2) and (8) to the selective amplifier SVA whereby in this case the relay A is energised.

When the subscriber connected does not make use of this opportunity to talk, the contact *ank3* is operated by the drum switch moving-on, and the follow-up switch is moved via the circuit:

(9) Positive battery pole (+)—*ank3*—contact *w2*—follow-up switch cam *fn3*—follow-up switch magnet FM—negative battery pole (−) into the position (3) wherein the cam contact *fn3* which in the position (2) had been closed is reopened so that the follow-up switch comes to a standstill.

In this position of the follow-up switch the circuit (5) is again in operation so that the subscriber is addressed by the request "Speak now please" via the circuits (5) and (2).

Thereupon by the aid of means which are known per se from the U. S. Patent No. 2,159,568 referred to hereinabove and which are accordingly not represented here, inter alia by the aid of a drum switch contact *ank4* (see Fig. 5) the recording head SPA is connected to the TV-amplifier output (the relays S and V, and the clutch KA being energised), so that the calling subscriber, who is not himself the owner of the telephonograph, can have his message to the latter recorded on the carrier band BA.

However, in the following it be assumed that it is the owner of the telephonograph himself who is calling in order to obtain reproduction of the messages recorded in his absence, and that in the interval following after the word "recorded" of the response text he has pronounced the vowel sound "AR" or a word containing the same, attention being called to the fact that the follow-up switch is still in the position (2). This has the consequence that the relay W to which are associated the follow-up switch contacts *fk4* (closed in position 2) and *fk5* (closed in the positions 2–4) is excited, to wit via the circuit:

(10) Positive battery pole (+)—A-relay contact *ao*—follow-up switch contact *fk4*—first coil of relay W—negative battery pole (−).

By the excitation of the W-relay a holding circuit is built up by the same for itself, viz.:

(11) Positive battery pole (+)—follow-up switch contact *fk5*—W-relay contact *w1*—holding coil of relay W—negative battery pole (−).

Since in the meantime the aforesaid interval after the word "recorded" has lapsed, the drum switch cam contact *ank3* is now operated so that the following circuit of Fig. 2 is now closed:

(12) Positive battery pole (+)—*ank3*—W-relay contact *w2*—follow-up switch cam contact *fn4*—follow-up switch magnet FM—negative battery pole (−), because the cam contact *fn4* had already been closed in the position (2) of the follow-up switch. Thereby the follow-up switch is moved-on directly two steps, until it gets into the position (4) in which position it is arrested owing to the opening of its cam contact *fn4*. Shortly after the contact *ank3* of the drum switch, the contact *ank6*, too, has been operated. Hence an exciter current for the relay S as follows:

(13) Positive battery pole (+)—*ank6*—follow-up switch contact *fk2*—relay S—negative battery pole (−).

In these circumstances the responder sound-head SPG is switched-off by the S-relay contact *s*, so that the invitation to talk "Speak now please" is suppressed. At the end of this invitation to talk the drum switch contact *ank6* drops off, so that the circuit (13) is interrupted again and the relay S drops off again. Together with the circuit (13) an analogous circuit had been built-up for the relay V which, however, had no effect in this connection yet.

Moreover a circuit ought to be mentioned, viz: (14) Positive battery pole (+)—*ank6*—*fk2*—relay V—negative battery pole (−), which would be interrupted, too, after the contact *ank6* had been opened. Subsequently to the invitation to talk: "Speak now please" (which in this case is suppressed), a series of code words is recorded on the carrier band BG which are separated from one another each by an interval. These code words serve for the marking of predetermined time intervals during which the subscriber has to pronounce definte sound signals into his microphone for the purpose of enforcing a reproduction of the messages recorded on the record carrier BA, which sound signals have to conform with a code adjusted on a coding device in order that the approach for reproduction may be successful.

Such a coding device is diagrammatically represented in Fig. 3. It shows a plurality of key contact arms SL—SP—SM—SB—SR—SW, each of which is permanently connected to the positive battery pole (+) and which can be adjusted at will to a position A, a zero position or a position E. Moreover the relay R, the relay F and a delayed action relay Z are associated with this arrangement.

It may now be assumed, that as the series of code words separated from one another by intervals six names of towns be recorded on the responder band BG, viz.: London (L)—Paris (P)—Madrid (M)—Berlin (B)—Rome (R) and Vienna (V). Since the key arm SL stands in Fig. 3 in the position zero, the arm SP in the position A and the arm SM in the position E, while the three subsequent ones are again in the position zero, it is thereby determined, that the calling subscriber, for the purpose of a correct approach for reproduction, has to pronounce after the response "Paris" the vowel "AR," after the response "Madrid" the vowel "AY" as a distinct control sound, whereas after the responses "London," "Berlin," "Rome," "Vienna" he must not utter any control sound at all.

In what follows the operation of the coding device represented in Fig. 3, in cooperation with parts of Fig. 1, will now be described. The follow-up switch is as stated still in the position (4), and the drum switch contact *ank5* has dropped-off at the end of the suppressed invitation to talk "Speak now please," so that the subscriber hears the response "London" over the circuits (2) and (5). During the subsequent time interval the drum switch contacts *ank6* and *ank7* are closed, so that the relay V is energised via the circuit (14). Thereby the circuit (5), too, is replaced by the circuit (8), because the contact *fk3*, too, is operative in the position (4), of the follow-up switch. The subscriber could accordingly pronounce a control vowel into the telephonograph in this first time interval via the circuits (2) and (8). If he does so, either the relay A or the relay E is excited. This would cause excitation of the relay F, to wit via the following circuit of Fig. 3:

(15) Positive battery pole (+)—key arm SL—*ank7o*—A- or E-relay contact *a2* or *e2*, respectively—relay F—negative battery pole (−).

Since in the position (4) and in the following positions of the follow-up switch the follow-up switch contact *fk6* is closed, the following holding circuit results in this case for the relay F:

(16) Positive battery pole (+)—follow-up switch contact *fk6*—F-relay contact *f1*—holding coil of relay F—negative battery pole (−).

However, if the subscriber does not utter a control vowel in the first interval after the response "London," the circuit (15) is not excited. After the termination of the aforesaid interval, the contacts *ank6* and *ank7* drop off and the subscriber hears via the circuits (2) and (5) the second code sign "Paris," whereupon the contacts *ank6* and *ank8* are operated, i. e. the circuits (2) and (8) are built-up again. If the subscriber pronounces now the control vowel "AR" as prescribed by the position of the key arm SP, the relay R is excited, to wit via the following circuit:

(17) Positive battery pole (+)—key arm SP—*ank8a*—A-relay contact *a1*—relay R—negative battery pole (−).

The relay R is held over the following circuit:

(18) Positive battery pole (+)—follow-up switch contact *fk6*—R—relay contact *r1*—holding coil of relay R—negative battery pole (−).

However, if the subscriber pronounces after "Paris" erroneously the control vowel "AY," then instead of the circuit (17) the following circuit is built-up:

(19) Positive battery pole (+)—key arm SP—*ank8a*—E-relay contact *e1*—relay F—negative battery pole (—), so that the relay F is energized and is held via the circuit (16). By means of the drum switch contact *ank8a* an exciter circuit for the delayed action relay Z would be built-up, to wit:

(20) Positive battery pole (+)—key arm SP—*ank8a*—A relay contact *a1*—delayed action relay Z—negative battery pole (—).

The delayed action relay Z, however, operates its contact *z* but shortly before the termination of the interval between the response "Paris" and the subsequent sound signal. Therefore, if the subscriber does not pronounce the control vowel "AR" as prescribed by the position A of the key arm SP, the relay F is again energised via the circuit:

(21) Positive battery pole (+)—Z-relay contact *z*—relay F—negative battery pole (—), the relay F being held by the circuit (16).

After the termination of the said interval the drum switch contacts *ank6* and *ank8* are opened so that the subscriber hears via the circuits (2) and (5) the third sound mark "Madrid" whereupon the contacts *ank6* and *ank9* are operated. In this interval the subscriber can pronounce the correct control vowel "AY" whereby the E-relay is energised via the circuits (2) and (8), and the relay R is energised via the circuit:

(22) Positive battery pole (+)—key arm SM—*ank9*—E-relay contact *e3*—relay R—negative battery pole (—), relay R being held via the circuit (18). If the subscriber pronounces instead of the vowel sound "AY" the wrong vowel sound "AR" the F-relay is energised via the A-relay contact *a3*, and if the subscriber does not talk, the relay F is energised over the *z*-contact (circuit 21). In a similar way the code words "Berlin," "Rome" and "Vienna" are later communicated to the subscriber, and in the subsequent intervals the contacts *ank10*, *ank11* and *ank12* are operated in the appropriate coordination beside the drum switch contact *ank6*. Since the key arms SB, SR and SW are set to zero according to Fig. 3, the subscriber must not in the corresponding intervals utter a control sound, because otherwise the relay F would be energised, as described in connection with the first code word "London." These six code words yield, with the choice of two different control vowels as provided, already the high number of 728 combinations so that in this way it is practically impossible, to guess the code combination adjusted without knowing it.

After the last of these six code words "Vienna" has been given and the subsequent interval has lapsed, the drum switch contact *ank2* drops off, and the contact *ank3* is switched on. If now the "wrong approach"-relay F has never been energised in the preceding stages of operation whereas the "correct approach"-relay R has been energised, the following circuit is built-up for the follow-up switch magnet FM by means of the cam contact *fn5* of the follow-up switch (which is in the closed position):

(23) Positive battery pole (+)—*ank2*—*ank3*—R-relay contact *r2*—F-relay contact *f2*—follow-up switch cam contact *fn5*—follow-up switch magnet FM—negative battery pole (—), whereby the follow-up switch is moved from the position (4), in which it has remained so far, to the position (5), in which position its cam contact *fn5* is opened, so that it comes to a standstill in this position. Thereby an exciter circuit for the relay S is set up, viz.:

(24) Positive battery pole (+)—follow-up switch contact *fk2*—relay S—negative battery pole (—), so that the switch *s* is switched-over from the responder sound head SPG to the recording sound head SPA. At the same time the magnetic clutch KA is energised via the circuit:

(25) Positive battery pole (+)—follow-up switch contact *fk7*—coil of clutch KA—negative battery pole (—).

This has the effect, that the drum TA is driven by the motor, and that the band BA is led past the recording sound head SPS in the direction of the arrow.

Messages recorded on the said carrier band BA are then passed to the transformer *u2* via the following circuit:

(26) Earth—sound head SPA—S-relay contact *s*—relay contacts *v1* and *v2*—sound amplifier TV—V-relay contact *v3*—transformer coil *u2*—earth.

The subscriber connected hears accordingly the messages recorded via the circuits (2) and (26).

If however in the operations of the coding device of Fig. 3 either the R-relay has not been energised at all and/or the "wrong approach"-relay F has been energised, the circuit (23) can not be built up when the drum switch contact *ank3* is operated, and the following circuit is set up instead:

(27) Positive battery pole (+)—*ank2*—*ank3*—R-relay contact *r2*—(F-relay contact *f2*)—follow-up switch cam contact *fn6*—follow-up switch magnet FM—negative battery pole (—), because the follow-up switch cam contact *fn6*, too, is closed already in the position (4) of the follow-up switch. In this case of "wrong approach"-control the follow-up switch is moved-on from its position (4) directly to the position (6). The circuits (24), (25) and (26) are accordingly not set up and the subscriber cannot hear the messages recorded. On the other hand, the subscriber can however be informed through means not shown that the telephonograph has been approached in the wrong way, and that the telephonograph is accordingly switched off.

Moreover it has become known from other telephonograph patents, that after the correct approach for reproduction an effacing-order of the subscriber can be carried out by special means, the selective amplifiers SVA and SVE as well as the drum switch and the follow-up switch being used therefor if desired, in order that further messages be either transmitted to the subscriber connected from the record carrier band BG, or be suppressed.

Of course it is possible, to use instead of two selective amplifiers SVA and SVE a single one of them only, whereby the wiring diagram is simplified, but the number of code combinations, too, is then greatly reduced, which however could be compensated by increasing the number of code words transmitted by the responder device. In this case it would be greatly advisable to retain the A-relay, because the frequency range in which the formants characteristic for the vowel sign "AR" lie (700 to 1200 C. P. S.) is transmitted safely by all telephone systems, whereas in certain cases the frequency range of 1900–3000 C. P. S. which is characteristic for the vowel sound "AY" is not always allowed to pass. For the other vowel this difficulty has a greater importance still.

For example with the vowel sign "EE" the characteristic formants lie in a range above 3000 C. P. S., and the vowel signs "OO" and "O" have the characteristic formants in the ranges of 155 to 380 C. P. S. and 420 to 650 C. P. S., respectively, and cannot therefore be filtered out so well.

By means of additional measures it would per se be possible to develop the device in such a manner that, during an interval between two code words, more than one control sound has to be pronounced, e. g. a series of differently composed sound impulses such as "AR"—"AY"—"AR"—"AY"—"AY"—"AR," so that already with a few code words a sufficiently high number of combinations can be achieved.

Finally it should be noted, that an ordinary sound amplifier can be made a selective amplifier thereby, that either at its output or at its input, or between two of its stages, a band-filter, composed of coils and condensers, is arranged, or that the coupling elements required are dimensioned in such a way, that predetermined frequency ranges only are effectively amplified.

What we claim as our invention and desire to secure by Letters Patent, is:

1. In a system for the remote control of a telephonograph to cause the reproduction of recorded messages over a public telephone line to a calling subscriber, a telephonograph including sound recording and reproducing means, means responsive to a calling subscriber including a sound carrier having prepared responses recorded on it separated by predetermined intervals from one another, driving means for said sound carrier, means including a step-by-step operated magnetic switch for operating said driving means, a transducer head cooperating with said sound carrier, means operatively connecting said transducer head to said public telephone line, a selective amplifier tuned to a predetermined frequency range characteristic of a vowel sound, a relay means connecting said relay to the output side of said selective amplifier, means for connecting the input side of the said selective amplifier to said public telephone line, a multiple contact switch, means for operating said multiple contact switch in synchronism with said magnetic switch, each of the contacts of said multiple contact switch having an operative position coordinated to one of the intervals between the responses recorded on said sound carrier, coding means, means connecting said coding means to the relay of said selective amplifier, key switches, means connecting each key switch to one of the contacts of said multiple contact switch, said last named switch having a zero position which is non-responsive to the range of frequency of said vowel, and another position responsive to said frequency range when applied to said selective amplifier, and switch members operatively connected to said sound reproducing means of the telephonograph, and means for controlling said switch members by said selective amplifier over said coding means for releasing said reproducing means for reproduction by the transmission of the said frequency range over said public telephone line at the intervals coordinated to the key switches of said coding means adjusted to said frequency range.

2. A system according to claim 1, including delayed action means operatively connected with the said selective amplifier energizing the relay associated with the said amplifier after the said frequency has been applied for a predetermined minimum period only.

3. A system according to claim 1, wherein the said selective amplifier is tuned to a frequency range between 700 to 1100 C. P. S., to amplify talking currents which correspond to the spoken vowel "AR," and to energize the relay associated with said amplifier.

4. A system according to claim 1, including a pair of selective amplifiers each tuned to a frequency range characteristic for a different vowel sound, means for connecting the input sides of said selective amplifiers to said public telephone line, two relays, one for each of the said selective amplifiers, means for connecting said relays to the output of their respective amplifiers, and coding means connected to the relays of the said selective amplifiers, said multiple contact switch having two positions each corresponding to one of the said range frequencies which are applied to the said selective amplifiers.

5. A system according to claim 4, wherein one of the said selective amplifiers is tuned to a frequency range between 700 to 1200 C. P. S., and the other one of the said selective amplifiers is tuned to a frequency range between 1900 to 3000 C. P. S., whereby talking currents which correspond to the spoken vowel sounds "AR" and "AY," respectively, are amplified by, and energize the relay associated to, the first mentioned and the last mentioned selective amplifier, respectively.

6. A telephonograph for the recording of messages and for the remote control release thereof over a public telephone system, comprising in combination: sound-recording and -reproducing means including a first sound carrier, driving means for the said sound carrier, a first transducer head cooperating with the said sound carrier, and a sound amplifier; responder means including a second sound carrier having prepared responses recorded on it separated by intervals from one another, clutch means connecting the said second sound carrier to the driving means for the said first sound carrier, and a second transducer head cooperating with the said second sound carrier; at least one selective amplifier tuned to a selected frequency range characteristic for a vowel sound means operatively connecting the input side of said selective amplifier to the output side of the said sound amplifier, a relay connected to the output side of the said selective amplifier; a multiple cam roller switch, means synchronizing said switch with the said driving means and closing its individual switches consecutively during the successive intervals between the individual responses recorded on the said second sound carrier; coding means connected to the relay of the said selective amplifier and including adjustable key switches each connected to one of the individual switches of the said multiple cam roller switch and having a zero position corresponding to no frequency of the said selected range being applied to the said selective amplifier and at least one other position corresponding to such selected frequency being applied to the said selective amplifier; a multiple contact follow-up switch operatively connected to the said multiple cam roller switch and moved-on stepwise by impulses received from the individual switches of the latter; switch-over means operatively connected to the said follow-up switch and controlling the operative connection of the said responder means and of the said sound-recording and -reproducing means to the public telephone system; and relay-controlled switch means operatively connected with the said coding means and with the relay of the said selective amplifier, releasing the said reproducing means for reproduction by the application of the said selected frequency range over the public telephone system at least once in each interval between responses recorded on the said second sound carrier coordinated to the key arms of the said coding device adjusted to the said selected frequency range, and by no such frequency range being applied in the intervals coordinated to the key arms of the said coding means adjusted to zero position, and locking the said reproducing means by the application of the said selected frequency range in the intervals coordinated to the key arms of the said coding means adjusted to zero position and by the said selected frequency not being applied in the intervals coordinated to the key arms of the said coding means adjusted to such selected frequency.

References Cited in the file of this patent

UNITED STATES PATENTS

| Number | Name | Date |
|---|---|---|
| 2,171,366 | Hipple | Aug. 29, 1939 |
| 2,221,883 | Rowe | Nov. 19, 1940 |
| 2,519,568 | Handschin | Aug. 22, 1950 |
| 2,537,406 | Handschin et al. | Jan. 9, 1951 |
| 2,537,407 | Handschin et al. | Jan. 9, 1951 |